United States Patent
Weeresinghe

(10) Patent No.: US 8,600,376 B2
(45) Date of Patent: Dec. 3, 2013

(54) LINE ROUTING TO WIRELESS ACCESS POINTS

(75) Inventor: Ranjith Thomas Mahinda Weeresinghe, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1502 days.

(21) Appl. No.: 11/758,547

(22) Filed: Jun. 5, 2007

(65) Prior Publication Data

US 2008/0009282 A1    Jan. 10, 2008

Related U.S. Application Data

(60) Provisional application No. 60/819,206, filed on Jul. 7, 2006.

(51) Int. Cl.
    *H04W 4/00*    (2009.01)
(52) U.S. Cl.
    USPC .................. 455/432.3; 455/432.1; 455/432.2; 455/445; 455/433; 455/435.1; 455/435.2; 455/434

(58) Field of Classification Search
    USPC ............. 455/432.3, 552.1, 432.1, 432.2, 445, 455/433, 435.1, 435.2, 434, 450
    See application file for complete search history.

(56) References Cited

U.S. PATENT DOCUMENTS

| | | | |
|---|---|---|---|
| 6,129,604 A * | 10/2000 | Maveddat et al. | 455/453 |
| 6,594,490 B1 * | 7/2003 | Toyoda et al. | 455/433 |
| 7,006,450 B2 * | 2/2006 | Kuster et al. | 370/252 |
| 2003/0100300 A1 * | 5/2003 | Yang et al. | 455/426 |
| 2006/0077957 A1 * | 4/2006 | Reddy et al. | 370/352 |
| 2006/0111112 A1 * | 5/2006 | Maveddat | 455/439 |
| 2007/0021143 A1 * | 1/2007 | Jain et al. | 455/552.1 |
| 2007/0111752 A1 * | 5/2007 | Pazhyannur | 455/552.1 |
| 2007/0142043 A1 * | 6/2007 | Artola et al. | 455/422.1 |

* cited by examiner

*Primary Examiner* — Khalid Shaheed

(57) ABSTRACT

A system for mobile communication is provided. The system includes an access point, a first mobile switching center associated with a mobile device, a second mobile switching center, and a call manager. The mobile device communicates with the access point. The second mobile switching center associates a temporary line direct number with the mobile device. The call manager routes a call from the second mobile switching center to the access point.

20 Claims, 5 Drawing Sheets

LINE ROUTING TO WIRELESS ACCESS POINTS

CROSS-REFERENCE TO RELATED APPLICATIONS

This application claims priority to U.S. Provisional Patent Application No. 60/819,206, entitled "TLDN Routing for Macro MSC Overlay Wireless Switches That Does Not Have E.164 Assigned", filed on Jul. 7, 2006, by Ranjith Weeresinghe, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless networks allow users mobility, freeing individuals from the restrictions of using a communication device cabled to a physical connection. A wireless access point or an access point (WAP or AP) is a device that connects wireless communication devices together to form a wireless network. The wireless access point usually connects to a wired network and can relay data between wireless mobile devices and wired devices, but can also communicate with or access another WAP. A WAP can be part of a larger network serving more users in an area.

Many mobile devices, such as dual mode handsets or phones, laptop computers, tablet computers, and personal digital assistants, may use a wireless access point to make audio calls through a call manager. Mobile devices can make such calls using a wireless access point connect to an internet protocol (IP) network instead of directly accessing a wireless service provider network, such as via code division multiple access (CDMA) or global systems for mobile communications (GSM), for example. For example, instead of directly accessing the wireless service provider network for a mobile phone via a cellular network, the mobile phone may make a call using a wireless access point because the wireless service provider network may have limited signal strength for reasons such as nearby obstructions, other electronic devices that might actively interfere with the signal by broadcasting on the same frequency, the type of antenna, the current weather, the operating radio frequency, and the power output of the mobile device. However, problems exist for mobile devices to receive calls using a wireless access point instead of directly accessing a wireless service provider network.

SUMMARY

In one embodiment, a system for mobile communication is provided. The system includes an access point, a first mobile switching center associated with a mobile device, a second mobile switching center, and a call manager. The mobile device communicates with the access point. The second mobile switching center associates a temporary line direct number with the mobile device. The call manager routes a call from the second mobile switching center to the access point.

In another embodiment, a method for communication is provided. A mobile switching center is selected based on available capacity. Multiple bearer paths are provided between the mobile switching center and a call manager servicing a mobile device via an access point, wherein the mobile device is associated with another mobile switching center. A temporary line direct number related to the mobile switching center is associated with the mobile device to promote communication with the mobile device.

In yet another embodiment, a system for line routing to wireless access points is provided. The system includes a pre-selected mobile switching center, a mobile device associated with a mobile switching center other than the pre-selected mobile switching center, a wireless access point in communication with the mobile device, a call manager, a bearer path to promote communication between the call manager and the pre-selected mobile switching center, and a home location registry. The home location registry promotes obtaining a temporary line direct number for the mobile device. A temporary line number associated with the pre-selected mobile switching center is associated with the mobile device.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, an incoming call for a mobile device using a wireless access point is routed through a mobile switching center associated with the mobile device and a call manager that is servicing the wireless access point. This routing requires the call manager to have multiple voice bearer paths to every mobile switching center in the network in order to handle calls to the wireless access points serviced by the call manager. Providing multiple bearer paths from each call manager in the network to hundreds of mobile switching centers may be expensive. Furthermore, determining which mobile switching center is associated with a mobile device using a wireless access point requires consumption of additional network resources.

Methods and systems of line routing to wireless access points are provided. Prior to any calls being made to a mobile device using a wireless access point, a mobile switching center is selected. Therefore, network resources are not consumed identifying the prefix for the mobile device to select a mobile switching center with the same prefix. A mobile switching center is selected, for example, based on its availability, and mobile switching centers with limited capacity are not selected. Multiple bearer paths are provided between the selected mobile switching center and the call manager that is servicing the mobile device via a wireless access point. By pre-selecting a limited number of mobile switching centers for routing such calls, the expenses associated with providing multiple bearer paths from hundreds of mobile switching centers to every call manager in a network are greatly reduced. A temporary line direct number related to the pre-selected mobile switching center is then associated with the mobile device to promote communication with the mobile device.

Figure 1:
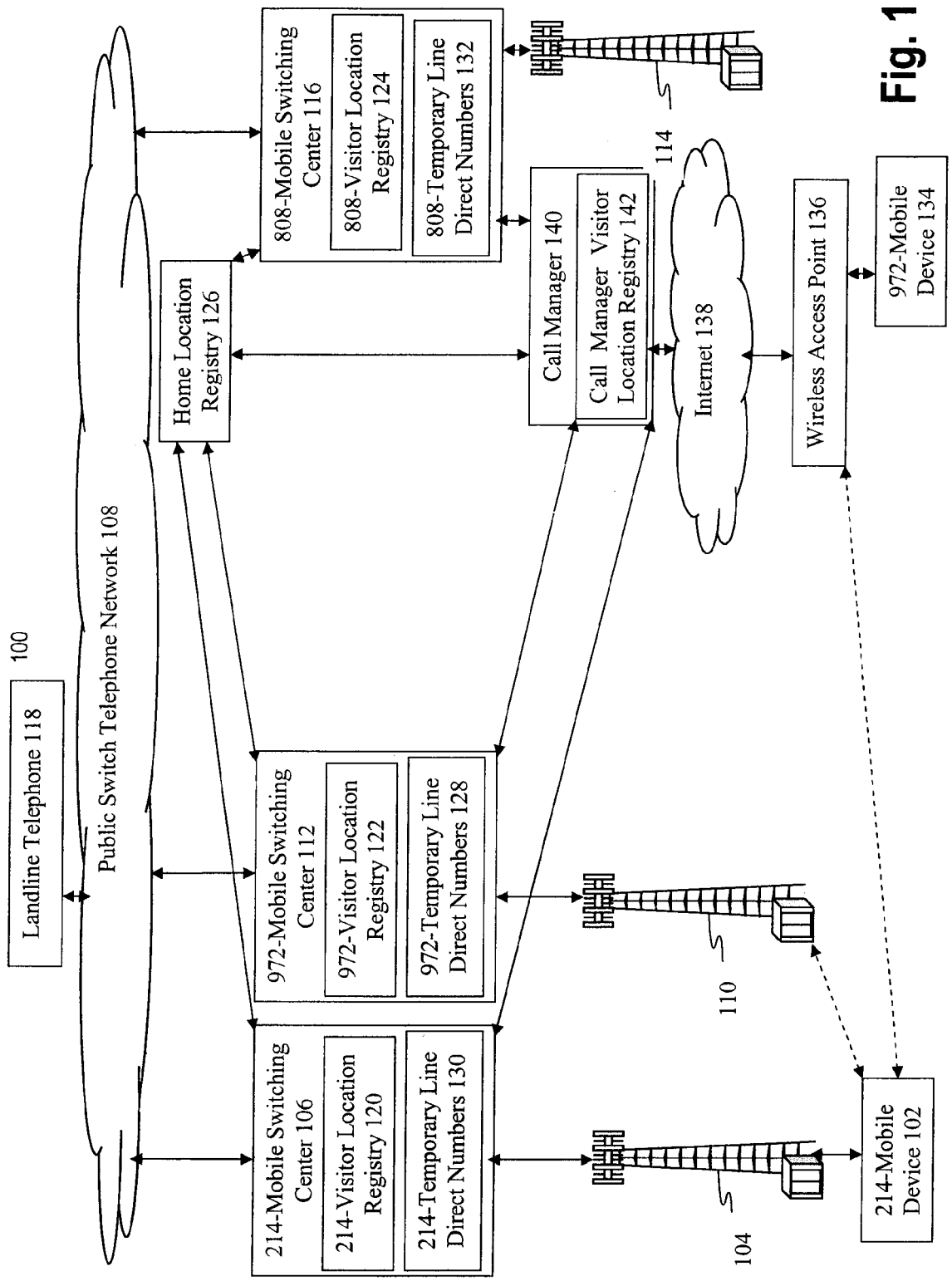
FIG. 1 shows a system of line routing to wireless access points according to an embodiment of the present disclosure.

FIG. 1 depicts a system 100 of line routing to wireless access points according to an embodiment of the present disclosure. The system 100 includes a 214-mobile device 102, which is a mobile device that is assigned a telecommunication number with a 214 prefix or area code. The 214-mobile device can be a dual mode mobile device that communicates via a cellular communication system in a first mode and communicates via a wireless computer network in a second mode. The mobile devices disclosed herein can be laptop computers, tablet computers, personal digital assistants, or mobile phones or handsets. A mobile device is described in more detail below with reference to FIGS. 3-5, and a computer is described in more detail below with reference to FIG. 6.

The 214-mobile device 102 can communicate via a first cell tower 104 and a 214-mobile switching center 106 to a public switch telephone network (PSTN) 108. The 214-mobile device 102 can also communicate either via a second cell tower 110 and a 972-mobile switching center 112 or via a third cell tower 114 and an 808-mobile switching center 116 to the PSTN 108. The cell tower and the mobile switching center that the 214-mobile device 102 uses to communicate is based on which cell tower is geographically the closest to the current location of the 214-mobile device 102 or provides the best signal. The 214-mobile switching center 106, the 972-mobile switching center 112, and the 808-mobile switching center 116 carry out switching functions and manage the communications between mobile devices and the PSTN 108. The mobile switching centers 106, 112, and 116 may be owned and deployed by a wireless service provider network, and allow mobile devices to communicate with each other and with telephones in a wider telecommunication network. The architecture of the mobile switching centers 106, 112, and 116 may resemble aspects of a telephone exchange, but there are additional functions which are needed because the mobile devices are not fixed in any geographic locations.

A landline telephone 118 can place a call via the PSTN 108 to communicate with the 214-mobile device 102. The PSTN 108 routes the call initially to the 214-mobile switching center 106 because, for example, the landline telephone 118 may have included the prefix 214 when placing the call or, because of its location, the landline telephone 118 may have the prefix 214 as a default for calls that do not specify a prefix. Because the 214-mobile device 102 may be out of range of the first cell tower 104 that serves the 214-mobile switching center 106, the 214-mobile switching center 106 includes a 214-visitor location registry 120 that stores identifiers of the mobile devices that have recently communicated with the 214-mobile switching center 106. Similarly, the 972-mobile switching center 112 has a 972-visitor location registry 122 and the 808-mobile switching center 116 has an 808 visitor location registry 124, where each visitor location registry stores the identifiers of mobile devices that have recently communicated with their corresponding mobile switching centers.

If the 214-visitor location registry 120 has an identifier of the 214-mobile device 102, indicating that the 214-mobile device 102 recently communicated with the 214-mobile switching center 106, the call from the landline 118 is routed via the 214-mobile switching center 106 and the first cell tower 104 to the 214-mobile device 102. However, if the 214-mobile device 102 has moved from being within range of the first cell tower 104, then the 214-visitor location registry 120 may no longer have the identifier of the 214-mobile device 102. Even if the 214-visitor location registry 120 still has the identifier of the 214-mobile device 102, attempts to communicate with the 214-mobile device 102 may fail if the 214-mobile device 102 is no longer within range of the cell tower 104. The failure of such an attempt to communicate via the cell tower 104 removes the identifier of the 214-mobile device 102 from the 214-visitor location registry 120. When the 214-visitor location registry 120 does not have the identifier of the 214-mobile device 102, the 214-mobile switching center 106 communicates with a home location registry 126. The home location registry 126 determines the current location of the 214-mobile device 102 based on the most recent mobile switching center with which the 214-mobile device 102 has communicated.

When the 214-mobile device 102 is within range of any cell tower, the 214-mobile device 102 communicates with the mobile switching center corresponding to that cell tower. If the corresponding mobile switching center does not have data necessary for providing wireless service for the mobile device, such as the 214-mobile device 102, the mobile switching center requests this data from the home location registry 126. The home location registry 126 has data for each mobile device that communicates in the network supported by the home location registry 126. The data for each mobile device can include a wireless subscriber profile, which can include a calling number, a caller name, and calling plans that offer features such as call forwarding, call waiting, and three-way calling. The home location registry 126 provides the necessary data, such as the wireless subscriber profile, to the requesting mobile switching center. This enables the requesting mobile switching center to provide the appropriate wireless services for the mobile device which is within range of the cell tower corresponding to the requesting mobile switching center.

For example, if the 214-mobile device 102 is within range of the second cell tower 110 corresponding to the 972-mobile switching center 112, the 214-mobile device 102 communicates with the 972-mobile switching center 112. The 972-mobile switching center 112 checks the 972-visitor location registry 122, which may not have a wireless subscriber profile for the 214-mobile device 102. Therefore, the 972-mobile switching center 112 requests the wireless subscriber profile for the 214-mobile device 102 from the home location registry 126. In addition to providing the wireless subscriber profile for the 214-mobile device 102 to the 972-mobile switching center 112, the home location registry 126 also records the current location of the 214-mobile device 102 as within range of the second cell tower 110 corresponding to the 972-mobile switching center 112.

Continuing this example, the 214-mobile switching center 106 communicates with the home location registry 126 to determine the current location of the 214-mobile device 102. The home location registry 126 determines that the most recent request for the wireless subscriber profile for the 214-mobile device 102 came from the 972-mobile switching center 112. The home location registry 126 may request verification from the 972-mobile switching center that the 972-visitor location registry 122 still has an identifier for the 214-mobile device 102. If verified, the PSTN 108 will route the call from the landline telephone 118 through the 972-mobile switching center 112.

However, the 972-mobile switching center 112 routes calls only for numbers associated with the prefix 972 and the 214-mobile device 102 is assigned a number with the prefix 214. To remedy this situation, the 972-mobile switching center 112 temporarily associates a reserved number having a 972 prefix with the number assigned to the 214-mobile device 102. The 972-mobile switching center 112 obtains this reserved number from a list of numbers specifically reserved for this purpose, 972-temporary line direct numbers 128. Similarly, the 214-mobile switching center 106 has 214-temporary line direct numbers 130 and the 808-mobile switching center 116 has 808-temporary line direct numbers 132. The 972-mobile switching center 112 creates a cross-reference index using the temporary 972 prefix number and the 214 prefix number assigned to 214-mobile device 102. A subsequent call received by the 972-mobile switching center 112 associated with the temporary 972 prefix number is routed to the 214 prefix number assigned to the 214-mobile device 102. The 972-mobile switching center 112 provides the temporary 972 prefix number associated with the 214-mobile device 102 to the home location registry 126 in response to the home location registry 126 request for verification that the 972-visitor location registry 122 still has an identifier for the 214-mobile device 102.

Upon receiving the temporary 972 prefix number from the 972-mobile switching center 112, the home location registry 126 provides the temporary 972 prefix number to the 214-mobile switching center 106, which requested the current location of the 214-mobile device 102. The 214-mobile switching center 106 provides the temporary 972 prefix number to the PSTN 108, which uses the temporary 972 prefix number to route the call from the landline telephone 118 through the 972-mobile switching center 112. The 972-mobile switching center 112 accesses the cross-reference index using the temporary 972 prefix number and the 214 prefix number assigned to 214-mobile device 102 to route the call to the 214-mobile device 102.

In addition to standard mobile device communication, a 972-mobile device 134 can communicate through a wireless access point 136 to access a network, such as the Internet 138. The 972-mobile device 134 is similar to the 214-mobile device 102 except for the differences in prefixes for the numbers assigned to the mobile devices. If moved within range of the wireless access point 136, the 214-mobile device 102 can also communicate through the wireless access point 136 to access the Internet 138. Many mobile devices, such as mobile phones, that are currently manufactured are dual mode devices able to communicate over both circuit and packet networks, such as cellular (CDMA, GSM) and IP networks, such as the Internet 138. The wireless access point 136 can be an access point base station, a residential wireless access point, or a similar communication device. The wireless access point 136 can access the Internet 138 through a wired cable, optical, wireless, or other communication means well known in the art. When in proximity to the wireless access point 136, a call made by the 972-mobile device 134 may use the wireless access point 136 to access the Internet 138, where the call is routed by a call manager 140 through a mobile switching center to the PSTN 108. The call manager 140 can include a call manager visitor location registry 142, which stores identifiers of the mobile devices that have recently communicated with the call manager 140.

However, problems exist for the 972-mobile device 134 to receive calls while using the wireless access point 136 instead of directly accessing a wireless service provider network, such as via the cell tower 114. For example, the landline telephone 118 places a call via the PSTN 108 for the 972-mobile device 134. The PSTN 108 routes the call initially to the 972-mobile switching center 112 because the landline telephone 118 entered the prefix 972. The 972-mobile switching center 112 includes the 972-visitor location registry 122 that stores the identifier of the mobile devices that have recently communicated with the 972-mobile switching center 112.

Because the 972-mobile device 134 has moved within range of the wireless access point 136, the 972-visitor location registry 122 may no longer have the identifier of the 972-mobile device 134. Even if the 972-visitor location registry 122 still has the identifier of the 972-mobile device 134, attempts to communicate with the 972-mobile device 134 via circuit-based services may fail. These attempts may fail because the user of the 972-mobile device 134 selects a mode that only communicates or prefers to communicate via packet-based networks using the wireless access point 136. The failure of such an attempt to communicate via circuit-based services removes the identifier of the 972-mobile device 134 from the 972-visitor location registry 122. The 972-mobile switching center 112 communicates with the home location registry 126 to determine the current location of the 972-mobile device 134, based on the most recent network component, such as a mobile switching center or a call manager, with which the 972-mobile device 134 has communicated.

The 972-mobile device 134 uses the wireless access point 136 to communicate with the call manager 140. If the call manager 140 does not have data necessary for providing wireless service to the 972-mobile device 134, the call manager 140 requests this data from the home location registry 126. The home location registry 126 obtains this information from the 972-mobile switching center 112 and provides the necessary data, such as the wireless subscriber profile, to the call manager 140. This data enables the call manager 140 to provide the appropriate wireless services for the 972-mobile device 134 which is within range of the wireless access point 136. In addition to providing the wireless subscriber profile for the 972-mobile device 134 to the call manager 140, the home location registry 126 also records the current location of the 972-mobile device 134 as within range of the wireless access point 136 corresponding to the call manager 140.

Continuing this example, the 972-mobile switching center 112 communicates with the home location registry 126 to determine the current location of the 972-mobile device 134. The home location registry 126 determines that the most recent request for the wireless subscriber profile for the 972-mobile device 134 came from the call manager 140. The home location registry 126 requests verification from the call manager 140 that the call manager visitor location registry 142 still has an identifier for the 972-mobile device 134. If verified, the PSTN 108 will use a temporary line direct number instead of the number assigned to the 972-mobile device 134, as described above, which was provided by the 972-mobile switching center 112 to route the call from the landline telephone 118 to the call manager 140. Because the 972-mobile device 134 is communicating through the wireless access point 136, the 972-mobile device 134 may be in a mode that does not respond to a call made using only the number assigned to the 972-mobile device 134.

Problems may be created when the call manager 140 does not have any or enough temporary line direct numbers for routing calls to mobile devices using wireless access points. The Federal Communication Commission (FCC) assigns temporary line direct numbers to a network component if the network component has a minimum number of subscribers. Mobile switching centers tend to have many more subscribers than the minimum number of subscribers required by the FCC. For example, the numerous mobile devices with the 214 prefix are considered to be subscribers for the 214-mobile switching center 106. But because mobile devices are categorized as subscribers only for their corresponding mobile switching centers, call managers that service mobile devices that use wireless access points are not considered to have any subscribers. Because the FCC assigns only a limited amount of temporary line direct numbers, these numbers may not be directly available for call managers. Therefore, the call manager 140 uses a temporary line direct number from a selected mobile switching center. An incoming call to the 972-mobile device 134 using the wireless access point 136 is routed through the selected mobile switching center using the temporary line direct number.

Currently, the call manager 140 selects the mobile switching center based on the prefix assigned to the 972-mobile device 134 using the wireless access point 136. Because the call manager 140 identifies the prefix assigned to the 972-mobile device 134 as 972 and the 972-mobile switching center 112 is associated with the 972 prefix assigned to the 972-mobile device, the call manager selects the 972-mobile switching center 112. Each mobile switching center in the network can have one or more bearer paths, or communication paths or channels, to the call manager 140. The call manager 140 identifies a bearer path between the 972-mobile switching center 112 and the call manager 140 that is available for routing the call to the 972-mobile device 134. Because the call manager 140 does not have its own temporary line direct numbers to provide to the home location registry 126, the call manager 140 provides the identified bearer path to the home location registry 126 in response to the home location registry 126 request for verification that the call manager visitor location registry 142 still has an identifier for the 972-mobile device 134.

Upon receiving the identified bearer path from the call manager 140, instead of receiving a temporary line direct number, the home location registry 126 provides the identified bearer path to the 972-mobile switching center 112, which requested the current location of the 972-mobile device 134. The 972-mobile switching center 112 selects a temporary 972 prefix number from the 972-temporary line direct numbers 128. The selection of the 972-mobile switching center 112 by the call manager 140 may create a problem if the 972-mobile switching center 112 is operating at maximum capacity, because such a mobile switching center may not have any temporary line direct numbers available to provide for routing calls to call managers. In such a situation, the 972-mobile switching center 112 will fail to route the call to the 972-mobile device 134. The 972-mobile switching center 112 associates the temporary 972 prefix number with the identified bearer path assigned for the 972-mobile device 134 to route the call using the temporary 972 prefix number and the identified bearer path through the wireless access point 136 and to the 972-mobile device 134.

However, such routing requires the call manager 140 to have multiple voice bearer paths to every mobile switching center in the network in order to handle calls to the wireless access point 136 serviced by the call manager 140. Providing multiple bearer paths from every call manager in the network to hundreds of mobile switching centers may be costly. Additionally, selecting the 972-mobile switching center 112 based on the prefix of the 972-mobile device 134 can result in a failed call routing if the 972-mobile switching center 112 is operating at maximum capacity, and therefore has no available temporary line direct numbers. Furthermore, determining which mobile switching center is associated with the 972-mobile device 134 using the wireless access point 136 consumes additional network resources.

Embodiments of the present disclosure do not require the expensive multiple bearer paths from every call manager in the network to hundreds of mobile switching centers, do not select mobile switching centers operating at maximum capacity, and do not consume network resources determining which mobile switching center is associated with a mobile device using a wireless access point. Instead, the present disclosure contemplates pre-selecting a limited number of pre-selected mobile switching centers based on their available capacity. These pre-selected mobile switching centers are used to provide bearer paths to call managers and route calls to call managers servicing mobile device using wireless access points.

In embodiments of the present disclosure, a system architect or network planner, for example, pre-selects at least one mobile switching center for a temporary line direct number based on available capacity, particularly on the availability of temporary line direct numbers, and not based on the prefix assigned to the 972-mobile device 134 using the wireless access point 136. If the system architect pre-selects multiple mobile-switching centers, the call manager 140 selects one of the pre-selected mobile switching centers for use. If the designers pre-select only one mobile-switching center, the call manager 140 selects the only pre-selected mobile switching center for use. Because the 808-mobile switching center 116 has available capacity, particularly a large amount of temporary line direct numbers, the call manager 140 selects the 808-mobile switching center 116. The 808-mobile switching center 116 can have a large amount of temporary line direct numbers because the 808-mobile switching center 116 is located in a geographical area with low population density, because the 808-mobile switching center 116 is a recently added mobile switching center, or because of any other reasons affecting available capacity. Although the 808-mobile switching center 116 has multiple voice bearer paths to the call manager 140, the call manager 140 does not require any bearer paths to the other mobile switching centers in the network. The call manager 140 identifies a bearer path between the 808-mobile switching center 116 and the call manager 140 that is available for routing the call to the 972-mobile device 134. The call manager 140 provides the identified bearer path to the home location registry 126 in response to the home location registry 126 request for verification that the call manager visitor location registry 142 still has an identifier for the 972-mobile device 134.

Upon receiving the identified bearer path from the call manager 140, the home location registry 126 provides the identified bearer path to the 972-mobile switching center 112, which requested the current location of the 972-mobile device 134. The 972-mobile switching center 106 provides the identified bearer path to the PSTN 108, which uses the identified bearer path to route the call from the landline telephone 118 through the 808-mobile switching center 116. The 808-mobile switching center 116 selects a temporary 808 prefix number from the 808-temporary line direct numbers 132. Because the 808-temporary line direct numbers 132 has a capacity for a large amount of available temporary line direct numbers, the possibility of failed call routing due to unavailable temporary line direct numbers is greatly reduced. The 808-mobile switching center 116 uses the temporary 808 prefix number and the identified bearer path assigned for the 972-mobile device 134 to route the call to the identified bearer path through the wireless access point 136 and to the 972-mobile device 134.

The system 100 shows only one landline telephone, only one wireless access point, and only one pre-selected mobile switching center for the purposes of an illustrative example, but the system 100 may include any number of landline telephones, wireless access points, bearer paths, and pre-selected mobile switching centers. Components in the system 100, such as the home location registry 126, the call manager 140, and the mobile switching centers, can be implemented by a general-purpose computer system, which is described in more detail below with reference to FIG. 6.

Figure 2:
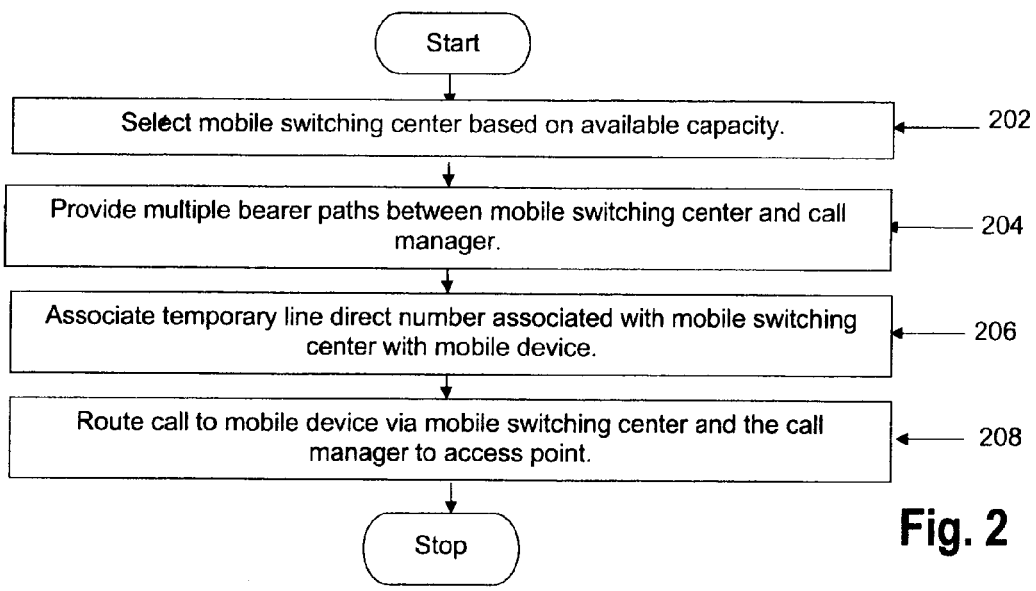
FIG. 2 shows a flow chart for a method of line routing to wireless access points according to an embodiment of the present disclosure.

Turning now to FIG. 2, a flowchart of a method of line routing to wireless access points is depicted according to an embodiment of the present disclosure. Executing the method enables calls to be routed to mobile devices using wireless access points that may reduce the costs associated with providing multiple bearer paths from every call manager in the network to hundreds of mobile switching centers.

In block 202, a mobile switching center is selected based on available capacity. For example, the 808-mobile switching center 116 is selected based on available capacity, particularly the large amount of temporary line direct numbers available due to the low population density area that the 808-mobile switching center 116 services.

In block 204, the mobile switching center provides multiple bearer paths between the mobile switching center and the call manager. For example, the 808-mobile switching center 116 provides multiple bearer paths between the 808-mobile switching center 116 and the call manager 140, but the call manager 140 does not have multiple bearer paths to either the 214-mobile switching center 106 or to the 972-mobile switching center 112.

In block 206, the mobile switching center associates a temporary line direct number associated with the mobile switching center with the mobile device. For example, the landline telephone 118 places a call via the PSTN 108 for the 972-mobile device 134 and the PSTN 108 routes the call initially to the 972-mobile switching center 112 because of the 972prefix. Because the 972-visitor location registry 122 does not have the identifier of the 972-mobile device 134, the 972-mobile switching center 112 communicates with the home location registry 126 to determine the current location of the 972-mobile device 134.

Because the 972-mobile device 134 uses the wireless access point 136 to access the internet 138, the 972-mobile device 134 communicates with the call manager 140, which requests a wireless subscriber profile from the home location registry 126. The home location registry 126 provides the wireless subscriber profile to the call manager 140, and records the current location of the 972-mobile device 134 as within range of the wireless access point 136 corresponding to the call manager 140.

Continuing this example, the 972-mobile switching center 112 communicates with the home location registry 126 to determine the current location of the 972-mobile device 134. The home location registry 126 determines that the most recent request for the wireless subscriber profile for the 972-mobile device 134 came from the call manager 140. The home location registry 126 requests verification from the call manager 140 that the call manager visitor location registry 142 still has an identifier for the 972-mobile device 134. In response to the request from the home location registry 126, the call manager 140 identifies a bearer path between the 808-mobile switching center 116 and the call manager 140 that is available for routing the call to the 972-mobile device 134. The call manager 140 provides the identified bearer path to the home location registry 126.

Upon receiving the identified bearer path from the call manager 140, the home location registry 126 provides the identified bearer path to the 972-mobile switching center 112, which requested the current location of the 972-mobile device 134. The 972-mobile switching center 106 provides the identified bearer path to the PSTN 108, which uses the identified bearer path to route the call from the landline telephone 118 through the 808-mobile switching center 116. The 808-mobile switching center 116 associates an 808-temporary line direct number associated with the 808-mobile switching center 116 with the 972-mobile device 134.

In block 208, a call to mobile device is routed via the mobile switching center and the call manager to the access point. For example, the call to 972-mobile device 134 is routed via the 808-mobile switching center 116, the identified bearer path, and the call manager 140 to the access point 136, which is in communication with the 972-mobile device 134.

Figure 3:
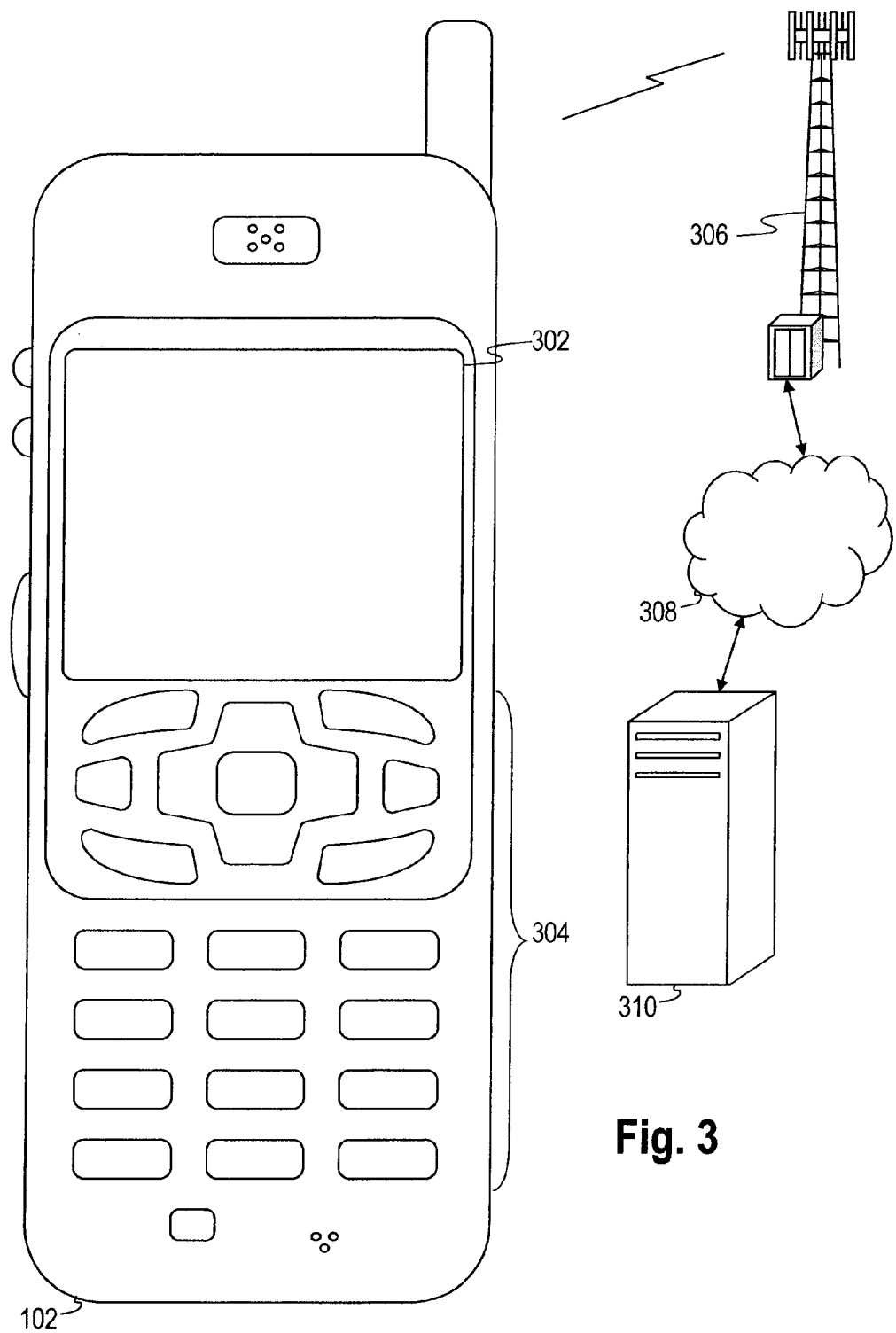
FIG. 3 shows an illustrative wireless communications system.

FIG. 3 shows a wireless communications system including the 214-mobile device 102, which is also referred to as the mobile device 102. FIG. 3 depicts the mobile device 102, which is operable for implementing aspects of the present disclosure, but the present disclosure should not be limited to these implementations. Though illustrated as a mobile phone, the mobile device 102 may take various forms including a dual mode handset, a wireless mobile device, a personal digital assistant (PDA), a portable computer, a tablet computer, and a laptop computer. Many suitable mobile devices combine some or all of these functions.

The mobile device 102 includes a display 302 and a touch-sensitive surface or keys 304 for input by a user. The mobile device 102 may present options for the user to select, controls for the user to actuate, and/or cursors or other indicators for the user to direct, including options such as telephone numbers to dial. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction.

Among the various applications executable by the mobile device 102 are a web browser, which enables the display 302 to show a web page. The web page is obtained via wireless communications with a cell tower 306, such as the first cell tower 104, a wireless network access node, such as the wireless access point 136, or another wireless communications network or system. The cell tower 306 (or wireless network access node) is coupled to a wired network 308, such as the internet 136. Via the wireless link and the wired network, the mobile device 102 has access to information on various servers, such as a content server 310. The content server 310 may provide content that may be shown on the display 302.

Figure 4:
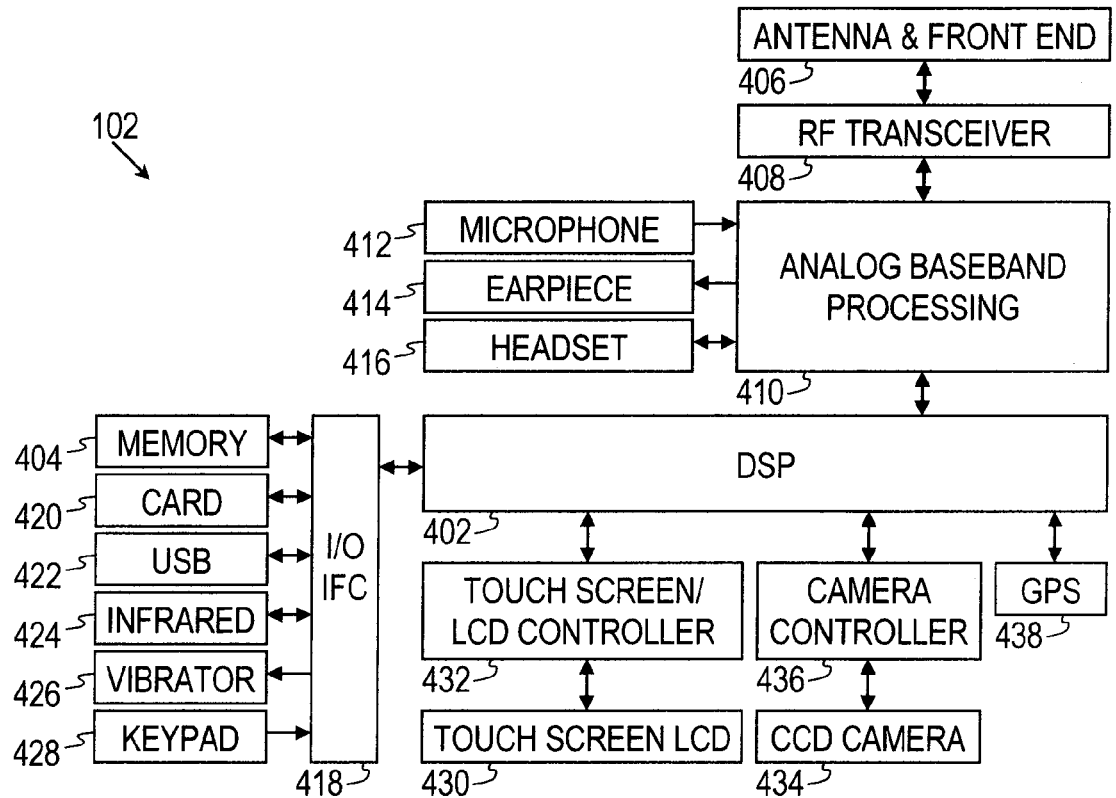
FIG. 4 shows a block diagram of an illustrative mobile device.

FIG. 4 shows a block diagram of the mobile device 102. The mobile device 102 includes a digital signal processor (DSP) 402 and a memory 404. As shown, the mobile device 102 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, and a global positioning system (GPS) sensor 438.

The DSP 402 or some other form of controller or central processing unit operates to control the various components of the mobile device 102 in accordance with embedded software or firmware stored in memory 404. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the mobile device 102 to send and receive information from a cellular network or some other available wireless communications network. The RF transceiver 408 provides frequency shifting, converting received RF signals to baseband and converting baseband transmit signals to RF. The analog baseband processing unit 410 may provide channel equalization and signal demodulation to extract information from received signals, may modulate information to create transmit signals, and may provide analog filtering for audio signals. To that end, the analog baseband processing unit 410 may have ports for connecting to the built-in microphone 412 and the earpiece speaker 414 that enable the mobile device 102 to be used as a cell phone. The analog baseband processing unit 410 may further include a port for connecting to a headset or other hands-free microphone and speaker configuration.

The DSP 402 may send and receive digital communications with a wireless network via the analog baseband processing unit 410. In some embodiments, these digital communications may provide Internet connectivity, enabling a user to gain access to content on the Internet 138 and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB interface 422 and the infrared port 424. The USB interface 422 may enable the mobile device 102 to function as a peripheral device to exchange information with a personal computer or other computer system. The infrared port 424 and other optional ports such as a Bluetooth interface or an IEEE 802.11 compliant wireless interface may enable the mobile device 102 to communicate wirelessly with other nearby mobile devices and/or wireless base stations, such as the wireless access point 136.

The input/output interface 418 may further connect the DSP 402 to the vibrator 426 that, when triggered, causes the mobile device 102 to vibrate. The vibrator 426 may serve as a mechanism for silently alerting the user to any of various events such as an incoming call, a new text message, and an appointment reminder.

The keypad 428 couples to the DSP 402 via the interface 418 to provide one mechanism for the user to make selections, enter information, and otherwise provide input to the mobile device 102, including information entered such as telephone numbers to dial. Another input mechanism may be the touch screen LCD 430, which may also display text and/or graphics to the user. The touch screen LCD controller 432 couples the DSP 402 to the touch screen LCD 430.

The CCD camera 434 enables the mobile device 102 to take digital pictures. The DSP 402 communicates with the CCD camera 434 via the camera controller 436. The GPS sensor 438 is coupled to the DSP 402 to decode global positioning system signals, thereby enabling the mobile device 102 to determine its position. Various other peripherals may also be included to provide additional functions, e.g., radio and television reception.

Figure 5:
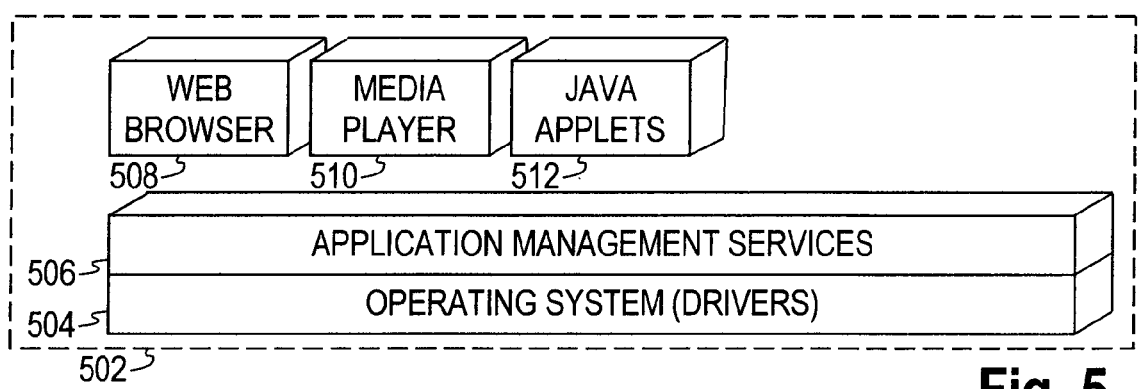
FIG. 5 shows a diagram of an illustrative software configuration for a mobile device.

FIG. 5 illustrates a software environment 502 that may be implemented by the DSP 402. The DSP 402 executes operating system drivers 504 that provide a platform from which the rest of the software operates. The operating system drivers 504 provide drivers for the mobile device hardware with standardized interfaces that are accessible to application software. The operating system drivers 504 include application management services ("AMS") 506 that transfer control between applications running on the mobile device 102. Also shown in FIG. 5 are a web browser application 508, a media player application 510, Java applets 512, and a component 514. The web browser application 508 configures the mobile device 102 to operate as a web browser, allowing a user to enter information into forms and select links to retrieve and view web pages. The media player application 510 configures the mobile device 102 to retrieve and play audio or audiovisual media. The Java applets 512 configure the mobile device 102 to provide games, utilities, and other functionality. The component 514 is configured to promote operation in accordance with disclosed embodiments.

Figure 6:
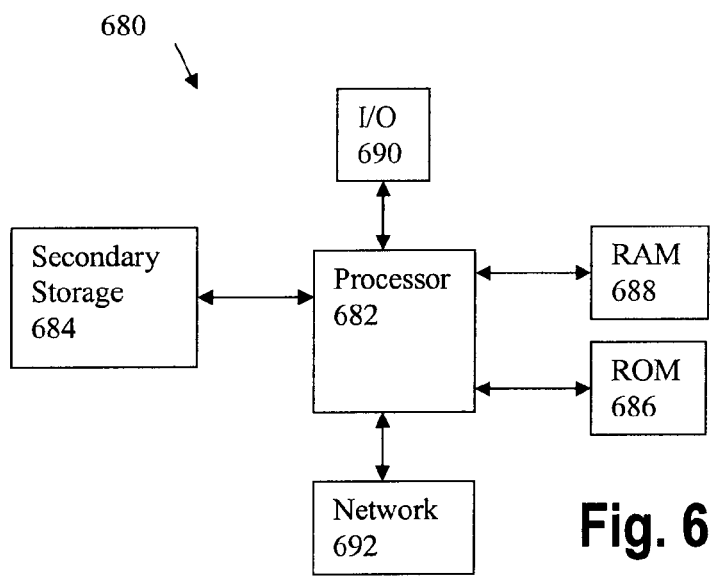
FIG. 6 illustrates an exemplary general-purpose computer system suitable for implementing the several embodiments of the disclosure.

The system 100 described above may be implemented using any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) 690 devices, and network connectivity devices 692. The processor may be implemented as one or more CPU chips.

The secondary storage 684 is typically comprised of one or more disk drives or tape drives and is used for non-volatile storage of data and as an over-flow data storage device if the RAM 688 is not large enough to hold all working data. The secondary storage 684 may be used to store programs that are loaded into the RAM 688 when such programs are selected for execution. The ROM 686 is used to store instructions and perhaps data that are read during program execution. The ROM 686 is a non-volatile memory device that typically has a small memory capacity relative to the larger memory capacity of secondary storage. The RAM 688 is used to store volatile data and perhaps to store instructions. Access to both the ROM 686 and the RAM 688 is typically faster than to the secondary storage 684.

The I/O 690 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 692 devices may enable the processor 682 to communicate with an Internet or one or more intranets. With such a network connection, it is contemplated that the processor 682 might receive information from the network, or might output information to the network in the course of performing the above-described method steps, including information such as registering to communicate with the wireless access point 136. Such information, which is often represented as a sequence of instructions to be executed using the processor 682, may be received from and outputted to the network, for example, in the form of a computer data signal embodied in a carrier wave.

Such information, which may include data or instructions to be executed using the processor 682 for example, may be received from and outputted to the network, for example, in the form of a computer data baseband signal or signal embodied in a carrier wave. The baseband signal or signal embodied in the carrier wave generated by the network connectivity 692 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts that it accesses from hard disk, floppy disk, optical disk (these various disk based systems may all be considered the secondary storage 684), the ROM 686, the RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for mobile communication, comprising:
   a call manager operable to route voice calls for a mobile device that is connected to an access point, the call manager communicatively coupled through a plurality of bearer paths to at least one mobile switching center, the call manager configured to:
      select one of the at least one mobile switching center based on availability of temporary line direct numbers,
      identify one of the plurality of bearer paths associated with the selected mobile switching center that is available for routing a call to the mobile device, and
      provide to a home location registry the identified bearer path in response to a request for verification that the call manager still has an identifier for the mobile device.

2. The system of claim 1, wherein the selected mobile switching center is one of a number of pre-selected mobile switching centers.

3. The system of claim 1, wherein the provided bearer path is used to route the call through the call manager to the mobile device.

4. The system of claim 1, wherein the mobile device is a dual mode mobile device operable to communicate via a cellular communication system in a first mode and a wireless computer network in a second mode.

5. The system of claim 1, wherein the mobile device is one of a laptop computer, tablet computer, personal digital assistant, and a mobile phone.

6. The system of claim 1, wherein the access point is one of a wireless access point and a residential wireless access point.

7. The system of claim 3, wherein the temporary line direct number is associated with a number assigned to mobile device.

8. The system of claim 3, wherein the temporary line direct number is not based on a prefix number assigned to mobile device.

9. The system of claim 1, wherein the selected mobile switching center is not associated with a prefix number assigned to mobile device.

10. A method of communication, comprising:
    selecting a mobile switching center to which a call manager is communicatively coupled through at least one bearer path, the mobile switching center selected based on availability of temporary line direct numbers;
    identifying a bearer path associated with the selected mobile switching center that is available for routing a call to a mobile device; and
    providing to a home location registry the identified bearer path in response to a request for verification that the call manager still has an identifier for the mobile device.

11. The method of claim 10, further comprising:
    servicing a second mobile device via the access point, wherein the second mobile device is not associated with the mobile switching center.

12. The method of claim 10, further comprising:
    selecting a second mobile switching center to which a call manager is communicatively coupled through at least one bearer path if the second mobile switching has higher availability of temporary line direct numbers;
    identifying a second bearer path associated with the selected mobile switching center that is available for routing a call to the second mobile device; and providing to the home location registry the second bearer path in response to a request for verification that the call manager still has an identifier for the second mobile device.

13. The method of claim 10, wherein the provided bearer path is used to route the call through the call manager to the mobile device.

14. The method of claim 10, wherein a temporary line direct number is associated with the identified bearer path to route the call from the selected mobile switching unit to the call manager.

15. The method of claim 14, wherein the temporary line direct number is not based on a prefix number assigned to mobile device.

16. A system for line routing to wireless access points, comprising:
   a data storage device;
   a communication interface; and
   a processor configured to:
      select a mobile switching center to which at least one bearer path is provided to a call manager, the mobile switching center selected based on availability of temporary line direct numbers;
      identify a bearer path associated with the selected mobile switching center that is available for routing a call to a mobile device, and
      provide to a home location registry the identified bearer path in response to a request for verification that the call manager still has an identifier for the mobile device.

17. The system of claim 16, wherein the selected mobile switching center is one of a number of pre-selected mobile switching centers.

18. The system of claim 16, wherein the provided bearer path is used to route the call through the call manager to the mobile device.

19. The system of claim 18, wherein the temporary line direct number is not based on a prefix number assigned to mobile device.

20. The system of claim 16, wherein the selected mobile switching center is not associated with a prefix number assigned to mobile device.

* * * * *